United States Patent
Ueda et al.

(10) Patent No.: US 12,403,447 B2
(45) Date of Patent: Sep. 2, 2025

(54) SEPARATING AGENT FOR OPTICAL ISOMERS

(71) Applicant: DAICEL CORPORATION, Osaka (JP)

(72) Inventors: Takunori Ueda, Myoko (JP); Ryota Hamasaki, Myoko (JP)

(73) Assignee: DAICEL CORPORATION, Osaka (JP)

( * ) Notice: Subject to any disclaimer, the term of this patent is extended or adjusted under 35 U.S.C. 154(b) by 953 days.

(21) Appl. No.: 17/403,137

(22) Filed: Aug. 16, 2021

(65) Prior Publication Data

US 2021/0370270 A1 Dec. 2, 2021

Related U.S. Application Data

(63) Continuation of application No. 15/466,628, filed on Mar. 22, 2017, now abandoned.

(30) Foreign Application Priority Data

Sep. 23, 2016 (JP) ................................ 2016-185811

(51) Int. Cl.
| | | |
|---|---|---|
| *B01J 20/24* | (2006.01) | |
| *B01D 15/38* | (2006.01) | |
| *B01J 20/10* | (2006.01) | |
| *B01J 20/26* | (2006.01) | |
| *B01J 20/28* | (2006.01) | |
| *B01J 20/29* | (2006.01) | |
| *B01J 20/291* | (2006.01) | |
| *B01J 20/32* | (2006.01) | |

(52) U.S. Cl.
CPC .......... *B01J 20/24* (2013.01); *B01D 15/3833* (2013.01); *B01J 20/103* (2013.01); *B01J 20/265* (2013.01); *B01J 20/28016* (2013.01); *B01J 20/28047* (2013.01); *B01J 20/29* (2013.01); *B01J 20/291* (2013.01); *B01J 20/3204* (2013.01); *B01J 20/3217* (2013.01); *B01J 20/328* (2013.01); *B01J 20/3293* (2013.01)

(58) Field of Classification Search
None
See application file for complete search history.

(56) References Cited

U.S. PATENT DOCUMENTS

| | | |
|---|---|---|
| 2005/0222454 A1 | 10/2005 | Okamoto et al. |
| 2007/0163961 A1 | 7/2007 | Kagamihara et al. |
| 2009/0105440 A1 | 4/2009 | Okamoto et al. |
| 2010/0041878 A1 | 2/2010 | Ohnishi et al. |

FOREIGN PATENT DOCUMENTS

| | | |
|---|---|---|
| EP | 0840752 B1 | 1/2000 |
| JP | 7-138301 A | 5/1995 |
| JP | 8-231489 A | 9/1996 |
| JP | 11-510193 A | 9/1999 |
| JP | 2004-163110 A | 6/2004 |
| WO | WO 03/091185 A1 | 11/2003 |
| WO | WO 2005/085835 A1 | 9/2005 |
| WO | WO 2007/129658 A1 | 11/2007 |
| WO | WO 2008/102920 A1 | 8/2008 |

*Primary Examiner* — Kara M Peo
(74) *Attorney, Agent, or Firm* — Birch, Stewart, Kolasch & Birch, LLP

(57) ABSTRACT

Provided is a separating agent for optical isomers, which is excellent in solvent resistance and has optical separating ability comparable to or higher than that of existing separating agents for optical isomers of chemical bonding type or physical adsorption type. In the separating agent for optical isomers, amylose (3-chloro-5-methylphenylcarbamate) is supported on a carrier through chemical bonding.

2 Claims, No Drawings

SEPARATING AGENT FOR OPTICAL ISOMERS

CROSS-REFERENCE TO RELATED APPLICATIONS

This application is a Continuation of copending application Ser. No. 15/466,628, filed on Mar. 22, 2017, which claims priority under 35 U.S.C. § 119(a) to Application No. 2016-185811, filed in Japan on Sep. 23, 2016, all of which are hereby expressly incorporated by reference into the present application.

BACKGROUND OF THE INVENTION

Field of the Invention

The present invention relates to a separating agent for optical isomers that is useful for separating optical isomers.

Description of the Related Art

As is known, polysaccharide derivatives obtained by modifying, with various substituents, hydroxyl groups in polysaccharides such as amylose have high optical separating ability as chiral stationary phases in chromatography. Numerous types of polysaccharide derivatives have been synthesized thus far.

Synthesis examples of polysaccharide derivatives useful as separating agents for optical isomers include for instance modification of hydroxyl groups or amino groups of polysaccharides using a compound having a halogen atom. WO 2008/102920 describes a polysaccharide derivative in which hydroxyl groups or amino groups of a polysaccharide are replaced by a phenylcarbamate having a halogen atom.

Japanese Patent Application Publication No. H8-231489 discloses a 3-chloro-5-methylphenylcarbamate derivative obtained through reaction of cellulose or amylose with 3-chloro-5-methylphenylisocyanate.

As specific examples of a carbamate derivative containing a halogen, WO 2008/102920 discloses however only a 3,5-dichlorophenylcarbamate derivative, a 2,4-dichlorophenylcarbamate derivative, a 3,4-dichlorophenylcarbamate derivative, a 2,5-dichlorophenylcarbamate derivative, a 4-fluorophenylcarbamate derivative, a 4-bromophenylcarbamate derivative and a 4-iodophenylcarbamate derivative.

Japanese Patent Application Publication No. H8-231489 discloses a 3-chloro-5-methylphenylcarbamate derivative. When the derivative is to be supported, as a separating agent for optical isomers, on a carrier, the examples involve however only an instance of production of a separating agent for optical isomers in which the derivative is physically adsorbed (coated) on the carrier.

SUMMARY OF THE INVENTION

WO 2008/102920 does not disclose the feature of using amylose tris(3-chloro-5-methylphenylcarbamate) represented by Formula (I) below. Japanese Patent Application Publication No. H8-231489 does not disclose a specific example of bonding the amylose tris(3-chloro-5-methylphenylcarbamate) derivative represented by Formula (I) to a carrier through chemical bonding.

It has come to be generally acknowledged that, among separating agents used in order to separate optical isomers, better separation performance is achieved when using separating agents in which the polysaccharide derivative is physically adsorbed (coated) onto the carrier (physical adsorption type), such as those described in Japanese Patent Application Publication No. H8-231489, than when using separating agents in which the polysaccharide derivative is chemically bonded to the carrier (chemical bonding type).

However, the inventors have found that, contrary to general perception to date, separation performance comparable to or better than that of separating agents of physical adsorption type, obtained through adsorption (coating) of amylose 3-chloro-5-methylphenylcarbamate onto a carrier, is achieved for specific optical isomers, also with a separating agent of chemical bonding type obtained by causing the same amylose derivative to be supported on a carrier via chemical bonding, as in the present invention.

Accordingly, the present invention provides a separating agent for optical isomers which has excellent separating ability towards specific optical isomers.

The present invention provides a separating agent for optical isomers being composed of amylose (3-chloro-5-methylphenylcarbamate) (hereafter also referred to simply as the amylose derivative) and a carrier in which amylose (3-chloro-5-methylphenylcarbamate) is supported on the carrier through chemical bonding. Among instances of amylose (3-chloro-5-methylphenylcarbamate), that instance where all the hydroxyl groups of amylose are replaced by 3-chloro-5-methylphenylcarbamate (i.e. amylose tris(3-chloro-5-methylphenylcarbamate)) has the structure represented by Formula (I) below. Among the amylose derivatives obtained in accordance with the production methods described below there are cases where not all the hydroxyl groups of amylose are replaced by 3-chloro-5-methylphenylcarbamate, depending on the chemical bonding forms that are obtained in the respective production methods. However, most hydroxyl groups in the amylose that makes up the amylose derivative are replaced by 3-chloro-5-methylphenylcarbamate.

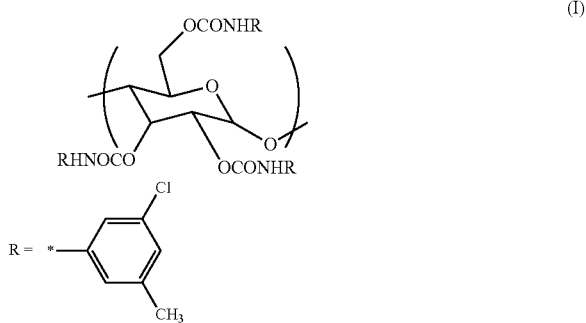

(I)

By virtue of the fact that the amylose derivative is chemically bonded to the carrier, it becomes possible to utilize, for sample dissolution or as a mobile phase in HPLC, solvents that could not be utilized with separating agents obtained through physical adsorption (coating) of the amylose derivative onto a carrier, specifically solvents that dissolve the above amylose derivative, such as ethyl acetate, N,N-dimethylacetamide (DMAc) or pyridine.

Depending on the optical isomer to be separated, the separating agent for optical isomers of the present invention exhibits better optical separating ability than conventionally known separating agents for optical isomers in which an amylose derivative having a halogen atom is supported on a carrier through chemical bonding. Further, the separating agent for optical isomers of the present invention exhibits optical separating ability comparable to or better than that of a separating agent for optical isomers in which the same amylose derivative as the amylose derivative used in the present invention is supported through physical adsorption.

Further features of the present invention will become apparent from the following description of exemplary embodiments.

DESCRIPTION OF THE EMBODIMENTS

The number-average degree of polymerization (average number of pyranose or furanose rings in one molecule) of the amylose used in the present invention is preferably 5 or higher, more preferably 10 or higher. The number-average degree of polymerization has no particular upper limit, but is preferably 1000 or lower from the viewpoint of ease of handling; herein the number-average degree of polymerization is preferably 5 to 1000, more preferably 10 to 1000, and particularly preferably 10 to 500.

Examples of the carrier used in the present invention include for instance porous organic carriers and porous inorganic carriers, preferably porous inorganic carriers. Appropriate porous organic carriers include polymer substances made up of for instance polystyrene, polyacrylicamide, polyacrylate or the like. Appropriate porous inorganic carriers include for instance silica gel, alumina, magnesia, glass, kaolin, titanium oxide, silicates, hydroxyapatite, zirconia and the like. The form of the porous inorganic carrier includes not only particulate carriers, and there may be used also inorganic carriers having been made mesh-like, as in organic-inorganic composites, as well as columnar integrated inorganic carriers that can be held in a column tube, such as those disclosed for instance in Japanese Patent Application Publication Nos. 2005-17268 and 2006-150214.

A particularly preferred carrier is silica gel, having a particle size of 1 μm to 100 μm, preferably 1 μm to 50 μm, and more preferably 1 μm to 30 μm, and having an average pore size of 1 nm to 4000 nm, preferably 3 nm to 500 nm. The surface is preferably subjected to a surface treatment, as in the various methods described below, in order to eliminate the influence of residual silanol.

Depending on the form of chemical bonding described below, the present invention includes an instance where substantially all the hydroxyl groups of the amylose derivative are replaced by 3-chloro-5-methylphenylcarbamate, as in Formula (I) below, and an instance where for example some of the hydroxyl groups of amylose are replaced by a polymerizable functional group used for bonding with the carrier, or by a group resulting from reaction with a functional group that causes a condensation reaction, while the remaining hydroxyl groups are replaced by 3-chloro-5-methylphenylcarbamate.

In the present embodiment, amylose (3-chloro-5-methylphenylcarbamate) encompasses conceptually amylose tris (3-chloro-5-methylphenylcarbamate).

In the separating agent for optical isomers of the present invention, the amylose derivative is supported on the carrier through chemical bonding. The feature "supported on the carrier through chemical bonding" includes an implementation where the amylose derivative and the carrier are directly bonded to each other by way of some binding group, and a form where amylose derivative molecules are bonded to each other or an amylose derivative and another substance are bonded to each other (crosslinking) on the surface of the carrier, to immobilize of the foregoing onto the carrier.

The reaction giving rise to such chemical bonds can be implemented in various ways.

In a first approach, a method involves allowing the hydroxyl groups of amylose to react beforehand with 3-chloro-5-methylphenylisocyanate, to produce amylose tris (3-chloro-5-methylphenylcarbamate), then physically adsorb this onto a carrier, and thereafter chemical bonding, to support the amylose tris(3-chloro-5-methylphenylcarbamate) on the carrier (hereafter, first method).

A method in a second approach involves chemically bonding the amylose and the carrier beforehand, and thereafter allowing the hydroxyl groups of amylose to react with 3-chloro-5-methylphenylisocyanate, to yield amylose (3-chloro-5-methylphenylcarbamate) bonded to the carrier (hereafter, second method).

A method in a third approach involves producing beforehand an amylose derivative in which some of the hydroxyl groups have been modified with 3-chloro-5-methylphenylcarbamate, introducing then another group into the remaining hydroxyl groups in the amylose, and thereafter using that other group to chemically bond to the carrier (hereafter, third method).

First Method

The method exemplified below can be illustrated as the first method, from among the above methods.

An amylose derivative to be supported on a carrier is prepared beforehand. The amylose derivative can be produced for instance in accordance with the method described in Japanese Patent Application Publication No. H8-231489. In a case where this method is used, the amylose derivative has a structure represented by Formula (I).

As a specific procedure, firstly amylose and 3-chloro-5 methylphenylisocyanate produced in accordance with the method described in Japanese Patent Application Publication No. H8-231489, or commercially procured, are caused to react with an alcohol and an isocyanate under ordinary conditions, to yield as a result an amylose derivative.

Examples of ordinary conditions under which the alcohol and isocyanate are caused to react include for instance performing the reaction in pyridine or N,N-dimethylacetamide/lithium chloride/pyridine, at 60° C. to 115° C. for 1 to 24 hours, in a nitrogen atmosphere, using 60 mol % to 300 mol % equivalents of 3-chloro-5-methylphenylisocyanate with respect to the hydroxyl groups in the amylose.

In an illustrative implementation, bonding between the amylose derivative and the carrier may be accomplished by coating the carrier with the amylose tris(3-chloro-5-methylphenylcarbamate) derivative obtained beforehand, causing then a crosslinking reaction through irradiation with light energy, to induce chemical bonding between the amylose derivative and the carrier through crosslinking by photocrosslinking. Irradiation by a laser beam or a mercury lamp can be used as the light energy source utilized for crosslinking.

Preferably, the carrier that is used in this method has been surface-treated beforehand with a silane treating agent. Preferred examples of silane treating agents are those having amino groups. Examples of silane coupling agents include commercially available ones.

A concrete crosslinking procedure may involve dispersing the carrier, coated with the amylose derivative, in an appropriate solvent, for instance hexane, methanol, ethanol, propanol, isopropanol, diethyl ether, tetrachloromethane, acetonitrile or an aqueous mixture thereof, and irradiating the resulting dispersion with light energy. The irradiation time is preferably about 1 minute to 24 hours, more preferably 3 minutes to 5 hours, and particularly preferably 5 minutes to 3 hours.

The supported amount of the amylose derivative on the carrier is preferably 1 to 100 parts by weight, more preferably 5 to 60 parts by weight, and particularly preferably 10 to 40 parts by weight, with respect to 100 parts by weight of the separating agent for optical isomers.

Second Method

Examples of the second method include the method disclosed in for instance Japanese Patent Application Publication No. H7-138301.

This method involves causing the reducing terminal of amylose and a carrier treated with a silane coupling agent having an amino group, for instance a silane treating agent such as 3-aminopropyltriethoxysilane, to react with each other, before reacting amylose with 3-chloro-5-methylphenylisocyanate, and thereafter causing 3-chloro-5-methylphenylisocyanate to react with the hydroxyl groups of amylose.

Methods for causing the carrier to be bonded to the reducing terminal of amylose include for instance the following two methods.

(Method 1 for Causing the Carrier to be Bonded to the Reducing Terminal of Amylose)

Firstly, the surface inside the pores of the carrier such as silica gel is subjected to a surface treatment with a silane treating agent having an amino group, specifically with 3-aminopropyltriethoxysilane. The surface treatment can be performed in accordance with a conventionally known method. The resulting carrier is added to an amylose solution obtained through dissolution in a solvent such as dimethyl sulfoxide (DMSO) or the like, with further addition of a reducing agent, and the reaction between amylose and the amino group present on the surface of the carrier is left to proceed at 50° C. to 80° C. for 12 hours, to bond through reductive amination.

The reaction may be conducted with neutralization to pH 6 to 8, through addition of acetic acid. The unreacted polysaccharide and the like are removed through washing using a solvent such as DMSO, acetone, hexane or the like, with vacuum drying, as a result of which there can be obtained amylose-bonded particles in which amylose and the carrier are chemically bonded to each other.

Examples of the reducing agent to be used includes borane compounds such as $NaBH_4$ (sodium borohydride), $NaBH_3CN$ (sodium cyanoborohydride), borane pyridine complexes, borane dimethylamine complexes, borane trimethylamine and the like. Among the foregoing it is preferable to use a reducing agent of weak reducing power, such as sodium cyanoborohydride or the like. When performing reductive amination, the reducing terminal portion of the amylose and the silane treating agent may be chemically bonded via a spacer. Specifically, reductive amination is performed at the reducing terminal portion of amylose and a spacer having an amino group as one functional group, such that chemical bonding can be performed with the silane treating agent at the other functional group of the spacer.

(Method 2 for Causing the Carrier to be Bonded to the Reducing Terminal of Amylose)

Herein amylose is dissolved in a solvent such as DMSO, a reducing agent and a silane treating agent having an amino group are added, the reducing terminal of amylose and the amino group are caused to react at 50° C. to 80° C., to bond through reductive amination, and obtain thereby a compound in which amylose and the silane treating agent are bonded to each other. In a case where the above method is resorted to, there occurs partial polymerization between silane treating agent molecules, and hence it is preferable to conduct the method in anhydrous conditions. A compound identical to those above can be used herein as the reducing agent.

An explanation follows next on bonding of silica gel and a compound resulting from bonding of amylose obtained as a result of the above reaction and a silane treating agent. The compound resulting from bonding of amylose obtained as a result of the above reaction and a silane treating agent is dissolved for instance in a solution of DMSO or lithium chloride-N,N-dimethylacetamide (LiCl-DMAc), with addition of pyridine as a catalyst, and addition of activated silica gel, as a result of which bonding to the carrier such as silica gel is accomplished, at the silane moiety of the compound resulting from bonding of amylose and the silane treating agent, in accordance with a method identical to conventionally known silane treatment methods. Particles are obtained as a result in which amylose and the carrier are chemically bonded to each other.

The compound obtained through bonding of the silane treating agent and the amylose synthesized in accordance with Method 2 for causing the carrier to be bonded to the reducing terminal of amylose has a comparatively unstable moiety of the silane treating agent. Accordingly, method 1 for causing the carrier to be bonded to the reducing terminal of amylose is more suitable from the viewpoint of handleability.

Modification of Hydroxyl Groups of Amylose

A 3-chloro-5-methylphenylcarbamate derivative can be obtained through reaction of 3-chloro-5-methylphenylisocyanate with the hydroxyl groups of amylose of particles in which amylose and the carrier are bonded to each other, obtained in accordance with method 1 or 2 for causing the carrier to be bonded to the reducing terminal of amylose, in anhydrous DMF, an anhydrous DMAc/LiCl/pyridine solution or anhydrous DMSO/pyridine, to replace all the hydroxyl groups of amylose present in the particles. This reaction can be conducted in accordance with a known method. Also, 4-dimethyl aminopyridine can be used instead of pyridine.

The amount of silane treating agent that reacts with the carrier such as silica gel is not particularly limited, but ordinarily is preferably about 5 wt % to 50 wt % with respect to the carrier. The performance as a separating agent for optical isomers can be enhanced by performing a terminal capping process, in accordance with a known method, in order to eliminate the influence of residual silanol groups in the obtained amylose derivative.

Third Method 1

The following method, disclosed in WO 03/091185, is an example of the above third method.

Specifically, the method involves copolymerizing a carrier having a polymerizable functional group, an amylose derivative having a polymerizable functional group and a polymerizable monomer having a polymerizable functional group, to chemically bond as a result the amylose derivative having a polymerizable functional group and the carrier having a polymerizable functional group.

An alternative method involves causing an amylose derivative having a polymerizable functional group to be supported on a carrier having a polymerizable functional group, followed by copolymerization using a polymerizable monomer. Derivatization of amylose and introduction of a polymerizable functional group may be carried out simultaneously when synthesizing the amylose derivative having a polymerizable functional group.

As a specific procedure for producing the amylose derivative having a polymerizable functional group, an illustrative method can be resorted to that includes: a protection step of protecting some of the hydroxyl groups of amylose; a step of modifying unprotected hydroxyl groups of amylose with 3-chloro-5-methylphenylisocyanate; a step of deprotecting the protected hydroxyl groups; and a step of modifying the deprotected hydroxyl groups using 3-chloro-5-methylphenylisocyanate and a compound having a polymerizable functional group.

In an illustrative implementation of this method, the hydroxyl group at position 6 of amylose may be replaced by a polymerizable functional group.

Herein there can be performed simultaneously the step of modifying the hydroxyl groups of amylose with 3-chloro-5-methylphenylisocyanate and the step of introducing a polymerizable functional group into amylose, using a compound having a polymerizable functional group, without including the above protection step.

Examples of the compound having a polymerizable functional group include for instance unsaturated acid halides such as acrylic acid chloride, methacrylic acid chloride, 4-vinylbenzoic acid chloride and the like, and unsaturated isocyanates such as vinyl phenyl isocyanate and 2-isocyanatoethyl methacrylate.

In an illustrative implementation, the proportion of the polymerizable functional group in the amylose derivative having a polymerizable functional group obtained in accordance with the above procedure may be 5% to 50%, preferably 5% to 30%, of the hydroxyl groups at position 6 of amylose.

In the above amylose derivative, some of the hydroxyl groups of amylose are replaced by 3-chloro-5-methylphenylisocyanate into 3-chloro-5-methylphenylcarbamate groups, while the other hydroxyl groups are replaced for instance by a substituent having a polymerizable functional group such as a vinyl group.

In an illustrative implementation, the protective group that is introduced in the protection step may derive from a compound having a triphenylmethyl group (trityl group), diphenylmethyl group, a tosyl group, a mesyl group, a trimethylsilyl group, a dimethyl(t-butyl)silyl group or the like, preferably a compound having a trityl group or a trimethyl silyl group.

Next, the amylose having a polymerizable functional group and produced in accordance with the above method, the carrier having a polymerizable functional group, and the polymerizable monomer, are bonded to each other through copolymerization.

A known method may be resorted to in order to produce the carrier having a polymerizable functional group, for instance the method disclosed in Japanese Patent Application Publication No. H4-202141.

In a case where silica gel is used as the carrier, specifically, a method can be resorted to in which amino groups are introduced into the silanol groups on the surface of the silica gel, through aminopropylation using a silane coupling agent having an amino group, for instance 3-aminopropyltriethoxysilane. Then, subsequent reaction of the amino group with for instance (meth)acryloyloxyalkylisocyanate in conducted to introduce an acrylic group or methacrylic group as a polymerizable functional group. In a case where silica gel is used as the carrier, a method can be resorted to in which a silane treating agent having a polymerizable functional group, for instance 3-(trimethoxysilyl)propyl methacrylate, is caused to react directly with the silica gel, to introduce thereby a polymerizable functional group into the carrier.

In the above methods, the polymerizable functional group introduced into the amylose derivative and the polymerizable functional group introduced into the carrier may be identical or different.

In this production method, the immobilization ratio of the amylose derivative is increased since the amylose derivative becomes bonded to the carrier through chemical bonding, caused by radical polymerization of the polymerizable functional groups among the amylose derivative having a polymerizable functional group, the carrier having a polymerizable functional group and the polymerizable monomer to be used in the method.

Known low molecular monomers having ethylenic double bonds can be used herein as the polymerizable monomer to be utilized. Examples of low molecular monomers include for instance hydrocarbon compounds having a vinyl group, such as styrene, divinylbenzene, butadiene, dimethyl butadiene, isobutylene and the like, methacrylic acid compounds such as methacrylic acid esters and methacrylic acid amides, acrylic acid compounds such as acrylic acid esters and acrylic acid amides, or compounds having silicon. The foregoing monomers can be used singly or as a plurality of monomers.

Styrene and divinylbenzene can be suitably used among the foregoing. The polymerizable functional group of the polymerizable monomer is preferably different from the polymerizable functional group of the amylose derivative and the polymerizable functional group of the carrier.

The amount of the polymerizable monomer added during copolymerization of the amylose derivative having a polymerizable functional group and the carrier having a polymerizable functional group can be adjusted as appropriate within a range such that the optical separating ability of the separating agent for optical isomers to be obtained is not impaired. In an illustrative implementation, specifically, the addition amount may be 1 to 50 parts by weight, preferably 5 to 30 parts by weight, and yet more preferably 5 to 15 parts by weight, with respect to 100 parts by weight of the amylose derivative having a polymerizable functional group.

In radical polymerization of the amylose derivative having a polymerizable functional group, the carrier having a polymerizable functional group and the polymerizable monomer, in accordance with the above method, it is preferable to cause the amylose derivative having a polymerizable functional group to be supported beforehand on the carrier having a polymerizable functional group. Herein, the amylose derivative can be caused to be supported on the carrier by preparing a solution in which the amylose derivative is dissolved in an appropriate solvent, coating then the carrier with the solution, and removing thereafter the solvent.

In an illustrative implementation, the amount of the amylose derivative having a polymerizable functional group supported on the carrier having a polymerizable functional group may be of 10 wt % to 60 wt %, preferably 15 wt % to 45 wt %, with respect to the carrier. A separating agent for optical isomers can be obtained thereafter by copolymerization of the carrier having the amylose derivative supported thereon and the polymerizable monomer, through addition to a solution in which a known radical initiator such as α,α'-azobisisobutyronitrile (AIBN) is dissolved.

Calculation method of the immobilization ratio of the amylose derivative explained above is as follows.

The unbound amylose derivative that elutes into a washing solution is recovered by washing of the separating agent for optical isomers obtained in accordance with the above method with a solvent that dissolves the amylose derivative having a polymerizable functional group. Then, the recovered unbound amylose derivative is dissolved in a deuterated solvent, with addition of a known amount of methanol. The weights of methanol and of the unbound amylose derivative are calculated on the basis of a peak intensity ratio of the foregoing. Finally, the immobilization ratio is calculated through a comparison of these weights with the weight of the amylose derivative having a polymerizable functional group and being adsorbed onto the carrier before copolymerization.

In an illustrative implementation, the immobilization ratio of the separating agent for optical isomers obtained in accordance with the above method is 70% or higher, preferably 80% or higher.

Third Method 2

The following method, disclosed in WO 2007/129658, is an example of the above second instance of the third method.

The method has specifically a step of modifying the hydroxyl groups of amylose with 3-chloro-5-methylphenylisocyanate, and thereafter obtaining an amylose derivative by modifying some of the remaining hydroxyl groups of the amylose with the compound represented by Formula (II), and a step of causing the amylose derivative to be supported on a carrier through chemical bonding.

$$A\text{-}X\text{—}Si(Y)_n R_{3-n} \tag{II}$$

(In the formula, A represents a reactive group that reacts with hydroxyl groups or amino groups, X represents a branched or unbranched C1 to C18 alkylene group or an optionally substituted arylene group, Y represents a reactive group that reacts with a silanol group to form a siloxane bond, R represents a branched or unbranched C1 to C18 alkyl group or an optionally substituted aryl group, and n represents an integer ranging from 1 to 3.)

Here, for example, "C1" represents carbon number of 1.

(1) Step of Producing an Amylose Derivative

The step of producing the amylose derivative includes the following steps: a first modification step of firstly modifying the hydroxyl groups of amylose with 3-chloro-5-methylphenylisocyanate, and a second modification step of modifying, using the compound represented by Formula (II), the hydroxyl groups of amylose not having been modified with 3-chloro-5-methylphenylisocyanate in the first modification step.

Preferably, the first modification step and the second modification step are performed in the order first modification step and second modification step, with a view to efficiently and controllably introducing the compound represented by Formula (II) into the polymer compound.

In the above Formula (II), A is a reactive group that reacts with hydroxyl groups or amino groups, for instance a chlorocarbonyl group, a carboxyl group, an isocyanate group, a glycidyl group or a thiocyanate group. Further, X is a branched or unbranched C1 to C18 alkylene group having optionally a heteroatom introduced thereinto, or an optionally substituted arylene group, preferably a branched or unbranched C1 to 18 alkylene group, and particularly preferably a propylene group, an ethylene group, a butylene group or the like. Further, Y is a reactive group that reacts with a silanol group to form a siloxane bond, preferably a C1 to C12 alkoxy group, a halogen or the like, particularly preferably a methoxy group, an ethoxy group, a propoxy group or the like. Further, R is a branched or unbranched C1 to C18 alkyl group or an optionally substituted aryl group, preferably an ethyl group, a methyl group or the like. Further, n represents an integer ranging from 1 to 3.

The above language "some" can be expressed as the introduction ratio of the compound represented by Formula (II) into the hydroxyl groups of amylose. The introduction ratio is preferably 1.0% to 35%, more preferably 1.0% to 20%, and particularly preferably 1.0% to 10%. The underlying reason for the above is that in a case where immobilization to the carrier such as silica gel is to be accomplished through chemical bonding, the immobilization ratio undesirably decreases when the introduction ratio of the compound represented by Formula (II) is lower than 1.0%, while if the introduction ratio exceeds 35%, the optical separating ability decreases, which is likewise undesirable.

The introduction ratio (%) is defined as follows. Specifically, the introduction ratio is a numerical value obtained by multiplying by 100 a ratio of the number of hydroxyl groups modified with the compound represented by Formula (II) with respect to the total number of hydroxyl groups of the amylose.

The step of producing the amylose derivative may further include an amylose dissolution step, in order to obtain an amylose solution. A known method can be resorted to in order to dissolve the amylose in the dissolution step. As an alternative means, there may be included a swelling step of swelling the amylose. Dissolved amylose can be purchased if commercially available.

An amide-based solvent is preferably used as the solvent for dissolving amylose in the above dissolution step. Examples thereof include for instance a mixed solution of N,N-dimethylacetamide/lithium chloride, or N-methyl-2-pyrrolidone/lithium chloride, or 1,3-dimethyl-2-imidazolidinone/lithium chloride, particularly preferably N,N-dimethylacetamide/lithium chloride.

Preferably, the dissolution step is carried out in a nitrogen atmosphere. The dissolution conditions can involve for example 20° C. to 100° C. and 1 to 24 hours, but may be adjusted as appropriate.

The above first modification step is a step of modifying the hydroxyl groups of amylose with 3-chloro-5-methylphenylisocyanate. A known method can be resorted to in order to accomplish this modification. Although not limited to the matter in the disclosure that follows, it is for instance preferable, from the viewpoint of control of the introduction ratio of the compound having a functional group, to modify the hydroxyl groups of amylose in dimethylacetamide/lithium chloride/pyridine, at 50° C. to 100° C., for 1 to 24 hours, in a nitrogen atmosphere, using 60 mol % to 100 mol % equivalents of 3-chloro-5-methylphenylisocyanate with respect to the hydroxyl groups in the amylose. In particular, the reaction temperature, the reaction time and the addition amount of the compound having a functional group are important factors when adjusting the introduction ratio of 3-chloro-5-methylphenylisocyanate.

The introduction position of 3-chloro-5-methylphenylisocyanate in the amylose derivative is not particularly limited.

The second modification step is a step of modifying, with the above compound represented by Formula (II), unreacted hydroxyl groups of the amylose in which hydroxyl groups have not been modified with 3-chloro-5-methylphenylisocyanate in the first modification step. A known method can be resorted to in order to accomplish this modification. Although not limited to the matter in the disclosure that follows, it is for instance preferable, from the viewpoint of control of the introduction ratio of the compound represented by Formula (II), to perform modification in N,N-dimethylacetamide/lithium chloride/pyridine, at 50° C. to 100° C., for 1 to 24 hours, in a nitrogen atmosphere, using 1 mol % to 10 mol % equivalents of the compound represented by Formula (II) with respect to the hydroxyl groups in the amylose before modification. The addition amount of the compound represented by Formula (II) is a particularly important factor in terms of controlling the introduction ratio of the compound represented by Formula (II).

The introduction position of the compound represented by Formula (II) in the amylose derivative is not particularly limited. In cases where unreacted hydroxyl groups are present in the amylose derivative at the time where the second modification step is over, it is preferable to cause the hydroxyl groups to react with 3-chloro-5-methylphenylisocyanate used in the first modification step.

The production process of the amylose derivative explained above may include at least a protective group introduction step of introducing a protective group in some of the hydroxyl groups of amylose; a first modification step of modifying, with 3-chloro-5-methylphenylisocyanate, the hydroxyl groups remaining in the amylose having been processed through the protective group introduction step; a removal step of removing the introduced protective group, to regenerate the hydroxyl groups; and a second modification step of modifying the regenerated hydroxyl groups with the compound represented by Formula (II). The production method having the above protective group introduction step and removal step allows modifying hydroxyl groups of amylose, at specific positions, with the compound represented by Formula (II).

In the production method having the protective group introduction step and removal step above, the protective group to be introduced during the protective group introduction step is not particularly limited, so long as the group can be removed from hydroxyl groups more easily than the modifying molecule with which the hydroxyl groups are modified in the modification step. The compound for introducing the protective group can be decided on the basis of the reactivity of the hydroxyl groups to be protected or modified, and on the basis of the reactivity of the compound towards the hydroxyl groups of amylose. Examples of the compound include compounds having for instance a triphenylmethyl group (trityl group), a diphenylmethyl group, a tosyl group, a mesyl group, a trimethylsilyl group or a dimethyl(t-butyl)silyl group. A compound having a trityl group or trimethyl silyl group is suitably used herein.

Introduction of the protective group into the hydroxyl groups and modification of the hydroxyl groups with 3-chloro-5-methylphenylisocyanate may be accomplished through known appropriate reactions. Removal of the protective group from the hydroxyl groups in the removal step is not particularly limited, and may be accomplished for instance in accordance with a known method such as hydrolysis by an acid or an alkali.

When resorting to the third method 2, a predetermined amount of the hydroxyl groups of amylose not having been modified with 3-chloro-5-methylphenylisocyanate in the first modification step can be modified with the compound represented by Formula (II) in the second modification step. Accordingly, the introduction ratio of the compound represented by Formula (II) into amylose can be controlled through adjustment of the amount of the compound represented by Formula (II) in the second modification step.

The following two methods relying on 1H NMR are preferably used to work out the introduction ratio of the compound represented by Formula (II) in the amylose derivative obtained in accordance with the above production method. When reactions are complete the introduction ratios of the compound represented by Formula (II) as worked out in accordance with each method exhibit matching values. Method (2) below was used in the present invention.

(1) The introduction ratio into amylose of a compound other than the compound represented by Formula (II) is determined on the basis of elemental analysis values of amylose prior to introduction of the compound represented by Formula (II). Thereafter, the introduction ratio of silyl groups in the amylose derivative is calculated on the basis of a ratio of the protons of the 3-chloro-5-methylphenylisocyanate into which the compound represented by Formula (II) has been introduced, and the protons of the functional groups directly bonded to the silicon of the compound represented by Formula (II), and the calculated value is taken as the introduction ratio of the compound represented by Formula (II) in the amylose derivative.

(2) The ratio of the protons of the 3-chloro-5-methylphenylisocyanate and the protons of the functional groups directly bonded to the silicon of the compound represented by Formula (II) is determined assuming that after the modification step the hydroxyl groups of the amylose derivative are completely modified with the modifying group. Then there is calculated the introduction ratio of the compound represented by Formula (II) in the amylose derivative.

(2) Step of Supporting the Amylose Derivative to be Supported on the Carrier Through Chemical Bonding A known process can be resorted to in the step of supporting the amylose derivative to be supported on a carrier such as silica gel, by chemical bonding. Preferably, the process includes a step of causing the amylose derivative to adsorb physically onto the carrier such as silica gel, and a step of chemical bonding in at least one instance from among chemical bonding between the carrier and the amylose derivative physically adsorbed on the carrier, and chemical bonding between molecules of the amylose derivative. In the step of chemical bonding in at least one instance from among chemical bonding between the carrier and the amylose derivative physically adsorbed on the carrier, and chemical bonding between molecules of the amylose derivative, immobilization is preferably carried out, from the viewpoint of enhancing the immobilization ratio, for instance at a ratio by weight of 1:2 to 1:20 of the amylose derivative having an introduction ratio of the compound represented by Formula (II) in the range of 1% to 35% and the carrier such as silica gel. Further, the immobilization is carried, for instance, in an acidic aqueous solution at pH of 1 to 6, at 0° C. to 150° C., for 1 minute to 24 hours. The reaction pH, the reaction temperature and the reaction time are particularly important factors in terms of increasing the immobilization ratio.

The immobilization ratio can be brought to 99% or higher by resorting to the above production method. The above immobilization ratio is a numerical value obtained by multiplying, by 100, a ratio of the weight of the amylose derivative present on the carrier after washing of the amylose derivative with a solvent in which the amylose derivative is soluble, with respect to the weight of the amylose derivative present on the carrier on which the amylose derivative has undergone the immobilization treatment. The immobilization ratio can be calculated on the basis of thermogravimetric analysis. In order to control the immobilization ratio it is preferable to control, besides the above conditions, for instance also the introduction ratio of the compound represented by Formula (II) into the hydroxyl groups of amylose, as described above.

Drops in optical separating ability can be suppressed by, after immobilization of the amylose derivative on the carrier, converting the residual silanol groups present on the silica gel, and/or the unreacted alkoxy groups in the Formula (II) having been introduced into the amylose derivative, to trialkylsiloxy groups, using a silane coupling agent such as chlorotrimethyl silane or chlorotriethylsilane, at an appropriate temperature. The above process of immobilization under acidic conditions may be omitted in a case where an acid is generated by the silane coupling agent in an amount sufficient so as to immobilize the amylose derivative on the carrier.

A filler for optical isomer separation of the present invention can be used also as a filler for high performance liquid chromatography (HPLC), or as a filler of a capillary column for gas chromatography or electrophoresis, in particular capillary electrochromatography (CEC), capillary zone electrophoresis (CZE) or micellar electrokinetic chromatography (MEKC).

The separating agent for optical isomers as described above is preferably used for a method for separating optical isomers. The illustrative examples of the separating method include HPLC and SFC. Known conditions (e.g. column length, inner diameter of the column, column temp., mobile phase (eluent), flow rate, and detector condition) for operating HPLC and SFC can be used in the separating method with the exception of using the separating agent as described above.

EXAMPLES

Examples will be illustrated below, but the present invention is not limited to these examples.

Example 1

Aminosilane Treatment of the Surface of Silica Gel

Herein 48 mL of anhydrous toluene and 4 mL of anhydrous pyridine were added to 40 g of silica gel (particle size 5 μm) having been activated beforehand (vacuum drying at 180° C. for 2 hours); there were further added 2.8 mL of 3-aminopropyltriethoxysilane, and the reaction was left to proceed under reflux for 12 hours, followed by filtering using a glass filter. The resulting surface-treated silica gel was washed with methanol, acetone or hexane, and was thereafter vacuum-dried at 60° C. for 2 hours, to yield surface-treated silica gel (aminopropyl-modified silica gel).

A solution resulting from dissolving 2.0 g of amylose in 16 mL of anhydrous DMSO was added to 10.0 g of the surface-treated silica gel, to disperse it. There were further added a solution resulting from dissolving 300 mg of NaBH$_3$CN in 10 mL of anhydrous DMSO, and 60 mg of acetic acid, and the reaction was left to proceed for 12 hours at 50° C. under nitrogen, to cause chemical bonding between the amino groups of the surface-treated silica gel and the reducing terminal of amylose.

The amylose-bonded silica gel thus obtained was filtered using a glass filter, the residue was washed with DMSO, tetrahydrofuran, methanol, acetone or hexane, to remove unbound amylose and so forth, and the resulting product was vacuum-dried at 60° C. Next, 10.0 g of the amylose-bonded silica gel were suspended in a mixed solvent of N,N-dimethylacetamide and pyridine, then 7.4 g of 3-chloro-5-methylphenylisocyanate were added, and the reaction was left to proceed at 70° C. for 24 hours, in a nitrogen atmosphere, to modify the hydroxyl groups of amylose chemically bonded to the silica gel surface. The suspension was filtered and was washed with N,N-dimethylacetamide and methanol, to yield a filler for optical isomer separation in which the amylose derivative was chemically bonded to the carrier.

Example 2

Herein 3.7 g of amylose were dispersed in 80 mL of anhydrous pyridine, there were added 23 g of 3-chloro-5-methylphenylisocyanate, and the reaction was left to proceed at 110° C. for 24 hours. The reaction solution was cooled and was dropped into methanol, as a result of which there was recovered an insoluble portion of amylose tris(3-chloro-5-methylphenylcarbamate), which was vacuum-dried at 60° C. Then 10 g of the obtained amylose derivative were dissolved in 70 mL of a mixed solution (90/10 (v:v)) of ethyl acetate (AE) and N,N-dimethylacetamide (DMAc). This amylose tris(3-chloro-5-methylphenylcarbamate) solution was applied uniformly onto 40 g of silica gel having been surface-treated as described in Example 1. Thereafter, the solvent was distilled off, to yield particles in which amylose tris(3-chloro-5-methylphenylcarbamate) was supported on silica gel through physical adsorption.

Then 10 g of the particles were suspended in a mixture of 100 mL of methanol and 400 mL of water, with stirring. The suspension was irradiated for 10 minutes using an immersion mercury lamp (Koninklijke Philips N.V., HPK-125 W, quartz-coated). The suspension was filtered and the resulting wet powder was washed with methanol and was dried. The powder was washed with ethyl acetate in order to remove unbound amylose derivative, and yield thereby a filler for optical isomer separation in which the amylose derivative was chemically bonded to the carrier.

Example 3

Herein 7.5 g of amylose were dissolved in a mixed solution of 6.5 g of lithium chloride and 100 mL of N,N-dimethylacetamide, then 76 mL of pyridine and 20.9 g of 3-chloro-5-methylphenylisocyanate were added to the resulting solution, and the reaction was left to proceed at 85° C. for 6 hours. Then 1.03 g of 3-triethoxysilyl propyl isocyanate were added, and the reaction was left to proceed for a further 16 hours. Thereafter 20.9 g of 3-chloro-5-methylphenylisocyanate were added, and the reaction was left to proceed for a further 7 hours. The resulting reaction solution was dropped into methanol, an amylose derivative as an insoluble portion was recovered, and thereafter the amylose derivative was vacuum-dried at 60° C., to yield an amylose derivative having alkoxysilyl groups partially introduced thereinto. Results of 1H NMR revealed that the introduction ratios of 3-chloro-5-methylphenylcarbamate groups and alkoxysilyl groups were 97.9% and 2.1%, respectively.

Then 1.5 g of the obtained amylose derivative were dissolved in 9 mL of ethyl acetate/DMAc (90/10), and the resulting solution was applied uniformly onto 6.0 g of silica gel having been surface-treated as described in Example 1, after which the solvent was distilled off.

Then 2.5 g of the substance obtained in the above process, in which the amylose derivative was supported on a carrier, was dispersed in ethanol/water/chlorotrimethyl silane (27 mL/7 mL/0.4 mL), and a reaction was conducted for 10 minutes while under boiling in an oil bath at 110° C., to immobilize the amylose derivative on the silica gel. The resulting product was washed with ethyl acetate and methanol, to remove unbound amylose derivative and so forth, and yield thereby a filler for optical isomer separation in which the amylose derivative was chemically bonded to the carrier.

Example 4

Herein 5.0 g of amylose were dissolved in 65 mL of N,N-dimethylacetamide with 5.0 g of lithium chloride. 25 mL of pyridine and 17.2 g of trityl chloride were added, and the reaction was left to proceed at 85° C. for 12 hours to protect position 6 of amylose. This was followed by addition of 18.3 g of 3-chloro-5-methylphenylisocyanate, and the reaction was left to proceed for a further 12 hours. The resulting reaction solution was dropped into methanol, and the insoluble portion was recovered. The entirety of the recovered product was dispersed in methanol/12 N hydrochloric acid=667 mL/19 mL, with stirring for 12 hours, to obtain as a result a carbamate derivative of amylose in which the trityl group at position 6 had been deprotected. This carbamate derivative of amylose was then vacuum-dried.

Then 4.0 g of the obtained carbamate derivative of amylose were dissolved in 28 mL of pyridine, with addition of 0.54 g of 3-chloro-5-methylphenylisocyanate. The reaction was left to proceed at 85° C. for 2 hours, and thereafter 0.38 g of 2-isocyanatoethyl methacrylate were added, and the reaction was conducted for 13 hours. There were further added 1.62 g of 3-chloro-5-methylphenylisocyanate, and the reaction was left to proceed for 7 hours, to derivatize thereby the remaining hydroxyl groups. The resulting reaction solution was dropped into methanol, and the insoluble portion was recovered and was thereafter vacuum-dried to yield as a result an amylose derivative with a proportion of 30% of vinyl groups introduced at position 6.

Then 1.5 g of each obtained amylose derivative were dissolved in 9 mL of ethyl acetate, and the resulting ethyl acetate solution was applied uniformly onto 6.0 g of silica gel having undergone a surface treatment as described in Example 1, after which the solvent was distilled off.

Then 10 mL of hexane having dissolved therein α,α'-azobisisobutyronitrile (AIBN) in an amount corresponding to 1/30 equivalents of vinyl groups were added, in a nitrogen atmosphere, to 2.5 g of the substance having the amylose derivative supported on the carrier, obtained in the above step. To the amylose derivative, there were further added 25 wt % of dimethyl butadiene as a third component, and a polymerization reaction was conducted for 20 hours in an oil bath at 80° C. After polymerization was stopped, the obtained filler was washed with ethyl acetate and methanol, to yield a filler for optical isomer separation in which the amylose derivative was chemically bonded to the carrier.

Comparative Examples 1 to 6

As comparative examples there were used below-described solvent-resistant separation columns for optical isomers commercially available from Daicel Corporation. All the columns had been packed with a filler for optical isomers in which a polysaccharide derivative (cellulose derivative or amylose derivative) was chemically bonded to a silica gel carrier. Table 1 summarizes information on product names and polysaccharide derivatives.

TABLE 1

| Comp. Ex. No. | Product name | Polysaccharide derivative |
|---|---|---|
| Comp. Ex. 1 | CHIRALPAK IA | Amylose tris (3,5-dimethylphenylcarbamate) |
| Comp. Ex. 2 | CHIRALPAK IB | Cellulose tris (3,5-dimethylphenylcarbamate) |
| Comp. Ex. 3 | CHIRALPAK IC | Cellulose tris (3,5-dichlorophenylcarbamate) |
| Comp. Ex. 4 | CHIRALPAK ID | Amylose tris (3-chlorophenylcarbamate) |
| Comp. Ex. 5 | CHIRALPAK IE | Amylose tris (3,5-dichlorophenylcarbamate) |
| Comp. Ex. 6 | CHIRALPAK IF | Amylose tris (3-chloro-4-methylphenylcarbamate) |

Comparative Example 7

As the filler there were used particles having physically adsorbed thereonto amylose tris(3-chloro-5-methylphenylcarbamate) prepared in Example 2, as they were, without performing chemical bonding.

Reference Example 1

Reference example 1 adheres to the method described in Y. Okamoto et al., J. Liq. Chromatogr., 10 (8&9), 1613, 1987.

Amylose and excess trityl chloride were caused to react in a DMAc/LiCl solvent at 100° C., to yield tritylamylose into which there were introduced about 1.5 trityl groups per glucose unit. Then 0.9 g of tritylamylose were dissolved in 10 mL of tetrahydrofuran (THF), and the resulting solution was uniformly sprinkled onto 3.0 g of silica gel having undergone a surface treatment with 3-aminopropyltriethoxysilane, obtained in accordance with the method described in Example 1. The solvent was then distilled off, to cause the tritylamylose to be supported on the silica gel. Then 30 mL of methanol and 0.3 mL of concentrated hydrochloric acid were poured onto the resulting silica gel, which was allowed to stand overnight, to remove the trityl groups.

After filtration, the silica gel was washed with methanol. This was followed by pouring of 30 mL of methanol and 0.3 mL of triethylamine, filtration once more, washing with methanol, and subsequent drying.

Then a solution of 224 mg of phenylene diisocyanate in 5 mL of anhydrous toluene was poured, under a nitrogen stream, onto 3.28 g of the obtained silica gel having had amylose adsorbed thereonto. After 4 hours, there were added 2 mL of pyridine, with heating at 60° C. After 70 hours, IR spectra confirmed the disappearance of NCO groups, whereupon there was added a solution resulting from dissolving 1.00 g of 3,5-dichlorophenylisocyanate in 4 mL of pyridine. Further 6 mL of pyridine were added, with heating at 110° C. After 20 hours of reflux, a glass filter was attached and filtration was performed, followed by washing with ethyl acetate and drying, to yield a filler for optical isomer separation in which the amylose derivative was chemically bonded to the carrier.

Analysis Conditions

Each separating agent for optical isomers produced in the examples was packed, in accordance with a slurry method, into a stainless steel column having a diameter of 0.46 cm and a length of 25 cm, and an analysis test was performed using the racemic forms (compounds 3 to 8, 10 and 11) given below, using a liquid chromatography (HPLC) device. The results are given in Table 2 and Table 3. The HPLC analysis conditions include mobile phase: (compounds 3 to 8 and 10) n-hexane/2-propanol=90/10 (v/v); (compound 11) n-hexane/ethanol/diethylamine=90/10/0.1 (v/v/v); flow rate: 1.0 ml/min; column temperature: 25° C.; detection wavelength: 254 nm.

In the tables, α represents the separation factor determined by capacity factors k1' and k2'. The capacity factors derived from Expressions (1) and (2) below where t0 denotes the time of passage of tri-tert-butylbenzene through the column, and t1 and t2 (herein t1<t2) denote respective elution times (first-peak and second-peak elution times) of the separated optical isomers. The separation factor α is determined on the basis of Expression (3) below using the above capacity factors.

$$k1'=(t1-t0)/t0 \quad (1)$$

$$k2'=(t2-t0)/t0 \quad (2)$$

$$\alpha=k2'/k1' \quad (3)$$

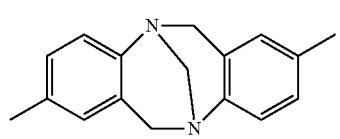

3

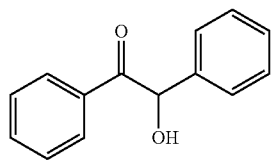

4

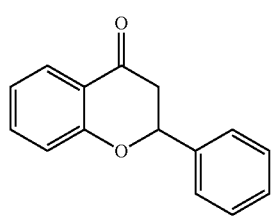

5

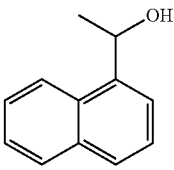

6

Co(acac)3

7

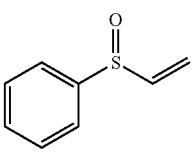

8

10

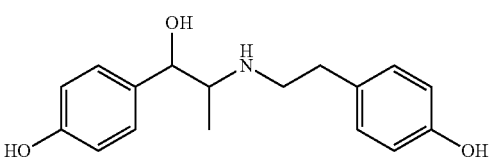

11

TABLE 2

| Racemic form No. | Example 1 | Example 2 | Example 3 | Example 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| 3 | 1.52 | 1.61 | 1.73 | 1.43 | 1.43 | 1.27 | 1.48 | 1.41 | 1.12 | 1.33 |
| 11 | 1.14 | 1.17 | 1.24 | 1.03 | 1.11 | 1.00 | 1.00 | 1.04 | 1.00 | 1.00 |

The results of Table 2 reveal that the separating agent for optical isomers of the present invention, which utilizes an amylose derivative in which the hydroxyl groups of amylose are replaced by 3-chloro-5 methylphenylcarbamate, exhibits better optical separating ability towards racemic forms 3 and 11 than a conventionally known separating agent for optical isomers in which a polysaccharide derivative is bonded to a carrier through chemical bonding.

TABLE 3

| Racemic form No. | Example 1 | Example 2 | Example 3 | Example 4 | Comp. Ex. 7 |
|---|---|---|---|---|---|
| 4 | 1.12 | 1.11 | 1.10 | 1.06 | 1.13 |
| 5 | 1.08 | 1.09 | 1.09 | 1.06 | 1.11 |
| 6 | 1.05 | 1.06 | 1.08 | 1.00 | 1.00 |
| 7 | 1.00 | 1.00 | 1.00 | 1.00 | 1.00 |
| 8 | 1.04 | 1.05 | 1.04 | 1.00 | 1.06 |
| 10 | 1.00 | 1.00 | 1.00 | 1.00 | 1.00 |

The results of Table 3 revealed that the separating agent for optical isomers of the present invention in which amylose (3-chloro-5 methylphenylcarbamate) is supported on the carrier through chemical bonding exhibits similar optical separating ability towards racemic forms 4, 5, 7, 8 and 10, and better optical separating ability towards racemic form 6, as compared with a separating agent for optical isomers in which amylose (3-chloro-5 methylphenylcarbamate) is supported on the carrier through physical adsorption.

This result runs surprisingly counter to common perception to the effect that separating agents of chemical bonding type have poorer optical separating ability than separating agents of physical adsorption type.

Reference Experimental Example

There were compared values of α obtained through separation of racemic forms 4 and 6 using separating agents for optical isomers (commercial products; notated as Comparative examples 1' to 6') in which polysaccharide derivatives identical to the chemically bonded polysaccharide derivatives in Comparative examples 1 to 6 were now physically adsorbed onto a carrier. The numerical values in the tables are worked out, for instance regarding Comparative example 1, in the form of: a value of Comparative example 1/α value of Comparative example 1'×100. The closer this numerical value is to 100%, the closer the optical separating ability is to that of a respective separating agent for optical isomers of physical adsorption type.

TABLE 4

| Racemic form | Comp. Ex. 1/ Comp. Ex. 1' | Comp. Ex. 2/ Comp. Ex. 2' | Comp. Ex. 3/ Comp. Ex. 3' | Comp. Ex. 4/ Comp. Ex. 4' | Comp. Ex. 5/ Comp. Ex. 5' | Comp. Ex. 6/ Comp. Ex. 6' | Example 1/ Comp. Ex. 7 | Example 2/ Comp. Ex. 7 | Example 3/ Comp. Ex. 7 |
|---|---|---|---|---|---|---|---|---|---|
| 4 | 84% | 83% | 92% | 90% | 97% | 94% | 100% | 99% | 98% |
| 6 | 100% | 76% | 101% | 94% | 100% | 100% | 105% | 106% | 108% |

Table 4 reveals that among separating agents for optical isomers of chemical bonding type and of physical adsorption type using the same polysaccharide derivative, in the comparative examples, the results conformed to conventional general perception to the effect that separating agents of physical adsorption type exhibit better optical separating ability, while in the present invention, by contrast, there is achieved an optical separating ability comparable to or better than that of separating agents of physical adsorption type.

The separating agent for optical isomers of the present invention exhibits better solvent resistance than existing separating agents for optical isomers of physical adsorption type, and has an optical separating ability comparable to or higher than that of existing separating agents for optical isomers of chemical bonding type or physical adsorption type. Therefore, using the separating agent for optical isomers of the present invention makes it possible to utilize solvents, as a mobile phase or for dissolving a sample, which could not be utilized for known separating agents for optical isomers of physical adsorption type, and may allow achieving good optical separating ability unattainable through the use of known separating agents for optical isomers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-185811, filed on Sep. 23, 2016, which is hereby incorporated by reference herein in its entirety.

What is claimed is:

1. A method for manufacturing a separating agent for optical isomers, comprising:
   radical copolymerization of an amylose derivative having a first radically polymerizable group, a carrier having a second radically polymerizable group, and a radically polymerizable monomer,
   wherein in the amylose derivative having the first radically polymerizable group, some of hydroxyl groups of amylose are replaced by 3-chloro-5-methylphenylisocyanate, while other hydroxyl groups are replaced by a substituent having the first radically polymerizable group,
   wherein the first radically polymerizable group of the amylose derivative and the second radically polymerizable group of the carrier are the same or different.

2. The method for manufacturing the separating agent for optical isomers according to claim 1,
   wherein the first radically polymerizable group of the amylose derivative is selected from a vinyl group, a methacrylic group, and an acrylic group;
   the second radically polymerizable group of the carrier is selected from a methacrylic group and an acrylic group; and
   the radically polymerizable monomer is selected from a hydrocarbon compound having a vinyl group, a methacrylic acid compound, and an acrylic acid compound.

* * * * *